(12) United States Patent
Vesuna

(10) Patent No.: US 7,496,070 B2
(45) Date of Patent: Feb. 24, 2009

(54) RECONFIGUREABLE ARRAYS OF WIRELESS ACCESS POINTS

(75) Inventor: Sarosh Vesuna, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 350 days.

(21) Appl. No.: 10/881,550

(22) Filed: Jun. 30, 2004

(65) Prior Publication Data

US 2006/0002326 A1    Jan. 5, 2006

(51) Int. Cl.
*H04B 7/212* (2006.01)

(52) U.S. Cl. .................. 370/331; 370/332; 370/334; 370/338

(58) Field of Classification Search ............ 340/539.12, 340/825.49, 573.4; 342/357.08, 450, 357.12, 342/453, 454, 457, 463, 465, 357.8; 375/133, 375/346, 347, 354, 267, 299; 702/179; 704/222, 704/270.1; 455/12.1, 13.1, 16, 41.2, 67.11, 455/67.16, 101, 137, 11.1, 404.1, 406, 410, 455/411, 420, 422, 427, 431, 432.1, 436, 455/435.1, 446, 447, 455, 517, 522, 576, 455/41; 370/229, 230.1, 231, 248, 252, 254–55, 370/294, 299, 310, 310.2, 312, 315–16, 320, 370/328–29, 331, 332, 334, 335, 338, 342–349, 370/351–353, 356, 400–402, 432, 437, 395.5, 370/395.52, 255, 316, 329
See application file for complete search history.

(56) References Cited

U.S. PATENT DOCUMENTS

| | | | | |
|---|---|---|---|---|
| 5,225,863 A * | 7/1993 | Weir-Jones | ............... | 396/56 |
| 5,448,290 A * | 9/1995 | VanZeeland | ............... | 348/153 |
| 5,729,826 A * | 3/1998 | Gavrilovich | ............... | 455/11.1 |
| 6,026,277 A * | 2/2000 | Gavrilovich | ............... | 455/11.1 |
| 6,496,105 B2 * | 12/2002 | Fisher et al. | ............... | 375/258 |
| 6,529,164 B1 * | 3/2003 | Carter | ............... | 342/463 |
| 6,590,884 B1 * | 7/2003 | Panasik | ............... | 370/338 |
| 6,658,325 B2 * | 12/2003 | Zweig | ............... | 700/245 |
| 6,674,403 B2 * | 1/2004 | Gray et al. | ............... | 342/463 |
| 6,705,522 B2 * | 3/2004 | Gershman et al. | ............... | 235/385 |
| 6,771,609 B1 * | 8/2004 | Gudat et al. | ............... | 370/254 |
| 6,920,319 B2 * | 7/2005 | Knutsson et al. | ............... | 455/422.1 |

(Continued)

OTHER PUBLICATIONS

*Enhancements to the User Location and Tracking System*, by Paramvir Bahl and Venkata N. Padmanabhan, Microsoft Technical Report MSR-TR-99-12, dated Feb. 1999, published by Microsoft Research.

(Continued)

*Primary Examiner*—Wing F. Chan
*Assistant Examiner*—Mark A. Mais
(74) *Attorney, Agent, or Firm*—Ingrassia, Fisher & Lorenz, P.C.

(57) ABSTRACT

A wireless communications network includes a reconfigurable array of access points for linking wireless devices in an infrastructure mode. One or more of the access points are mobile. The mobile access points in the network can be repositioned to change the geographic distribution of the bandwidth coverage provided by the wireless network. The mobile access points may be repositioned to redistribute available network bandwidth heterogeneously according to the demand for bandwidth in local areas and to meet quality of service standards.

20 Claims, 4 Drawing Sheets

U.S. PATENT DOCUMENTS

| | | | |
|---|---|---|---|
| 7,038,584 B2 * | 5/2006 | Carter | 340/539.13 |
| 7,042,867 B2 * | 5/2006 | Whitehill et al. | 370/338 |
| 7,053,826 B1 * | 5/2006 | McBurney et al. | 342/357.12 |
| 7,065,350 B2 * | 6/2006 | Capobianco et al. | 455/422.1 |
| 7,072,323 B2 * | 7/2006 | Roberts et al. | 370/338 |
| 7,081,818 B2 * | 7/2006 | Eckstein et al. | 340/572.1 |
| 7,096,090 B1 * | 8/2006 | Zweig | 700/245 |
| 7,113,497 B2 * | 9/2006 | Cromer et al. | 370/338 |
| 7,149,197 B2 * | 12/2006 | Garahi et al. | 370/328 |
| 7,174,238 B1 * | 2/2007 | Zweig | 700/245 |
| 7,184,423 B2 * | 2/2007 | Bryan et al. | 370/338 |
| 7,187,867 B2 * | 3/2007 | Kawabe et al. | 398/126 |
| 7,206,294 B2 * | 4/2007 | Garahi et al. | 370/315 |
| 7,222,000 B2 * | 5/2007 | Wang et al. | 700/259 |

OTHER PUBLICATIONS

*User Location and Tracking in an In-Building Radio Network*, by Paramvir Bahl and Venkata N. Padmanabhan, Microsoft Technical Report MSR-TR-99-12, dated Feb. 1999, by the same authors, published by Microsoft Research.

\* cited by examiner

RECONFIGUREABLE ARRAYS OF WIRELESS ACCESS POINTS

BACKGROUND OF THE INVENTION

The present invention relates to wireless networks used for data communication, and more particularly to the infrastructure of the wireless networks.

Wireless communication has been available in varying forms since early in the 20th Century. However, the ability to readily connect through a wireless medium by radio on an anytime-anywhere basis, particularly for data communication purposes, is more recent. The recent ability to connect on anytime-anywhere basis has been facilitated by developments of cellular and Personal Communications Services (PCS) networks into second and third generation digital; the entry of new competitive wireless service providers; vast improvements in digital signal processing; and new WLAN based commonly-adopted industry Standards such as IEEE Standard 802.11, IEEE Standard 802.16, IEEE Standard 802.20, Wireless Application Protocol (WAP), or the Bluetooth protocol. These developments have resulted in dramatic growth in the infrastructure and capabilities of wireless data communication networks (e.g., wireless local area networks (WLAN), wireless communication devices (e.g., cell phones, personal digital assistants (PDA), laptop computers, etc.) and user interest.

Wireless communication devices (including, for example, those that are in common vernacular called "Wi-Fi devices") are radio devices that connect to each other by transmitting and receiving signals on a specific frequency of the radio band. The Wi-Fi devices, which can be mobile, may connect to each other directly (i.e. in a "peer-to-peer mode" configuration). Alternatively, the Wi-Fi devices may connect via a wireless network gateway, a Wireless Switch or "access point" (i.e. in an "infrastructure mode" configuration). Many access points can be connected in a grid to create the WLAN Infrastructure. The access points may be connected to each other wirelessly or via wire lines (e.g., Ethernet cables). The WLAN may be designed to provide wireless connectivity to users in a local area such as an industrial plant, warehouse or distribution center, manufacturing facility, office building, college or university campus, coffeehouse, library, and other private or public spaces.

The access points to a WLAN are radio transceivers that are configured to communicate with one or many Wi-Fi devices according to suitable standard association and sharing protocols (e.g., IEEE Standard 802.11b). Each access point has a limited range or coverage area over which it can effectively communicate with associated Wi-Fi devices. The number N of access points and the distance D between them, in a WLAN infrastructure configuration, are often selected to provide contiguous coverage in the local area served by the WLAN, for example, to enable roaming (whereby a person using the network can move from the communication range of one access point to another and experience no data loss). However, wireless networks, like wired networks, are a shared medium. Each access point in the WLAN has a limited capacity or bandwidth for communications with Wi-Fi devices. For example, an IEEE Standard 802.11b wireless network may provide 11 Mbps of bandwidth to an individual Wi-Fi device user. However, if multiple Wi-Fi device users simultaneously access the wireless network through the same access point, each user will have to share the limited bandwidth. If a large number of users simultaneously connect to the WLAN though a particular access point, undesirable degradation of bandwidth service for all users can result. A common solution for meeting peak demand for bandwidth is to over design the WLAN infrastructure by installing additional access points or higher speed access points (e.g., 802.11a or 802.11g access points that provide 54 Mbps or better of bandwidth) in zones (i.e. "hot spots") where high demand is likely. However, such an over design of an infrastructure WLAN can be wasteful of resources if, for example, the peak demand for bandwidth is temporary or if the high demand zones change geographically.

Co-pending and co-assigned application Ser. No. 09/528, 697, filed Mar. 17, 2000, which is incorporated by reference herein, describes a wireless system which follows the protocol of IEEE Standard 802.11, but which uses a combination of RF Ports and Cell Controllers to perform the functions of Access Points of a classical IEEE 802.11 data communications system. Lower level medium access control (MAC) functions are performed by the RF Ports and higher-level functions, including association and roaming functions, are performed by the cell controller or a wireless switch. The term "access point" as used herein is intended to include conventional access points, such as those which follow the protocol of IEEE Standard 802.11 and perform all MAC functions, as well as RF Ports operating with cell controllers and wireless switches, as described in the incorporated co-pending application.

In addition to providing data communications, a WLAN also can be used to physically locate the Wi-Fi devices. The use of data communications systems to perform location functions for locating mobile units is described in articles entitled *Enhancements to the User Location and Tracking System*, by Paramvir Bahl and Venkata N. Padmanabhan, and *User Location and Tracking in an In-Building Radio Network*, Microsoft Technical Report MSR-TR-99-12, dated February 1999, by the same authors, both published by Microsoft Research. As described therein the signal strengths from mobile devices, are used for locating mobile devices within an area serviced by the system. Other techniques for locating a mobile device using the wireless data communications systems or other location systems are possible. Some of these techniques may involve triangulation of the mobile device from a number of access points. The effectiveness of such techniques can be a function of the distance between access points and the number of access points.

Consideration is now being given to ways of enhancing wireless network infrastructure. Attention is in particular directed to arrangements of access points for responding to fluctuations in demand for bandwidth. Attention is also directed to arrangements for improving the resolution and granularity with which the location of a wireless mobile device or wireless tag can be determined by the access points.

SUMMARY OF THE INVENTION

In accordance with the invention, systems and methods are provided for accommodating fluctuating bandwidth demands on infrastructure wireless networks. A wireless network with a reconfigurable array of access points is provided. The configuration includes mobile access points whose physical and topological positions in the network can be adjusted or changed. The physical positions of these mobile access points may be adjusted or changed to respond to demand or expected demand for bandwidth or location determination capabilities in a specific sub area (or zone) of the area serviced by the wireless network. An enterprise mobility network controller system may be used to automatically adjust or change the positions of the mobile access points to geographically redistribute the bandwidth capacity or to increase the resolution and granularity of the real time location by the network. The bandwidth capacity may be redistributed heterogeneously with larger portions of the available capacity allotted to zones that have greater demand for bandwidth at a particular time.

In one embodiment of the invention, the coverage area of the wireless network (or portions thereof) is traversed by rails or tracks on which mobile access points can move. The array of access points in the wireless network includes mobile access points which can move on these rails or tracks, and also may include conventional fixed access points. A network controller may be deployed to supervise the movement of mobile access points along the rails to provide different levels of wireless coverage in different geographic portions or zones. Alternatively or additionally the access points themselves may communicate with each other in adhoc mode to determine their own optimal position in the array of mobile access points.

The reconfigurability of the array of access points also can be exploited for purposes other than meeting bandwidth demand. For example, in wireless networks that are configured to locate wireless signal sources, the mobile access points may be repositioned to optimal locations for triangulation of a subject wireless signal source.

In a preferred embodiment, the wireless network, includes a programmable network controller for supervising the movement of the mobile access point from a first position to a second position. The two positions may, for example, correspond to suitable access point locations for providing bandwidth coverage in different rooms or areas of a convention center or other structure. The network controller may be programmed to move the mobile access point according to a room usage schedule or in response to the relative demand for wireless access by users in proximity to the first and second positions. The ability to redistribute available bandwidth geographically may allow the network service provider to meet a real time quality of service guarantees or requirements.

A mobile access point may be configured to travel on an overhead rail or may be adapted to travel on a floor vehicle. In some applications, a mobile access point may be configured to travel together with a user wireless device (e.g., an RFID portal which includes an RFID reader). In such applications, the user wireless device may use its companion mobile access point to communicate data over the wireless network.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Throughout the figures, unless otherwise stated, the same reference numerals and characters are used to denote like features, elements, components, or portions of the illustrated embodiments.

DETAILED DESCRIPTION OF THE INVENTION

In accordance with the invention, a flexible configuration of access points is provided in a wireless network for responding to geographic fluctuations in bandwidth demand. The configuration includes mobile access points whose physical positions in the network can be adjusted or changed. The physical positions of these mobile access points may be adjusted or changed to respond to demand or expected demand for bandwidth or real time location resolution or granularity requirements in a specific sub area (or zone) of the area serviced by the wireless network. The concentration of mobile access points in a portion of the network may be increased to provide additional bandwidth coverage in a specific zone if desired. Conversely, the concentration of mobile access points may be decreased in the portion of the network to reduce the available bandwidth coverage in the zone if so desired. A controller system may be used to automatically adjust or change the positions of the mobile access points according to a schedule. The controller system may include suitable electrical and mechanical motive means for moving a mobile access point from one position to another.

The inventive configuration of mobile access points may be implemented in new installations of wireless networks or to supplement the existing infrastructure of fixed wireless networks. In either case, the use of the mobile access points can advantageously reduce the costs of installing, upgrading or maintaining wireless network infrastructure.

Figure 1:
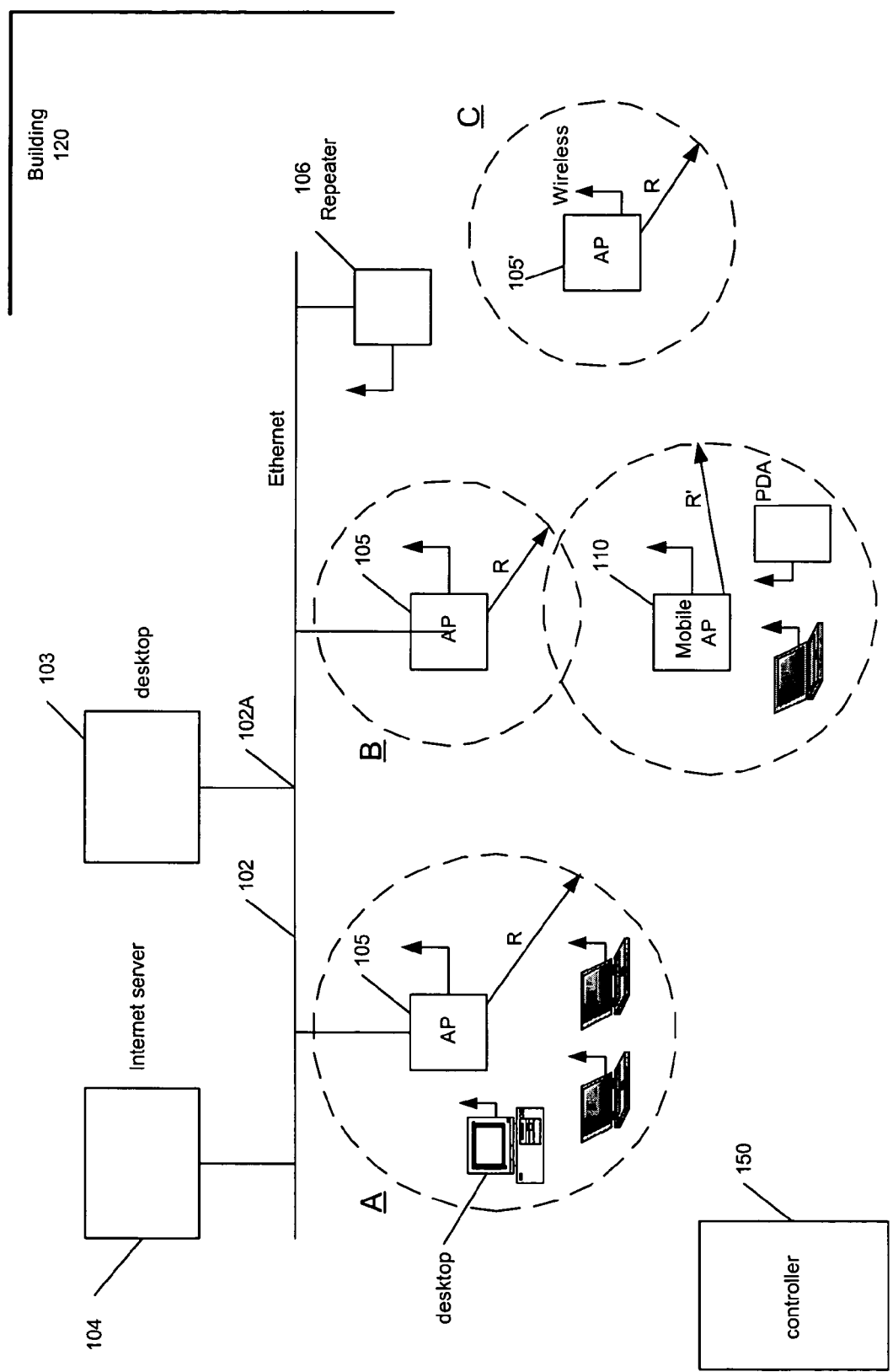
FIG. 1 is a schematic representation of a WLAN which includes a mobile access point and also includes other fixed access points, in accordance with the principles of the present invention.
Figure 2:
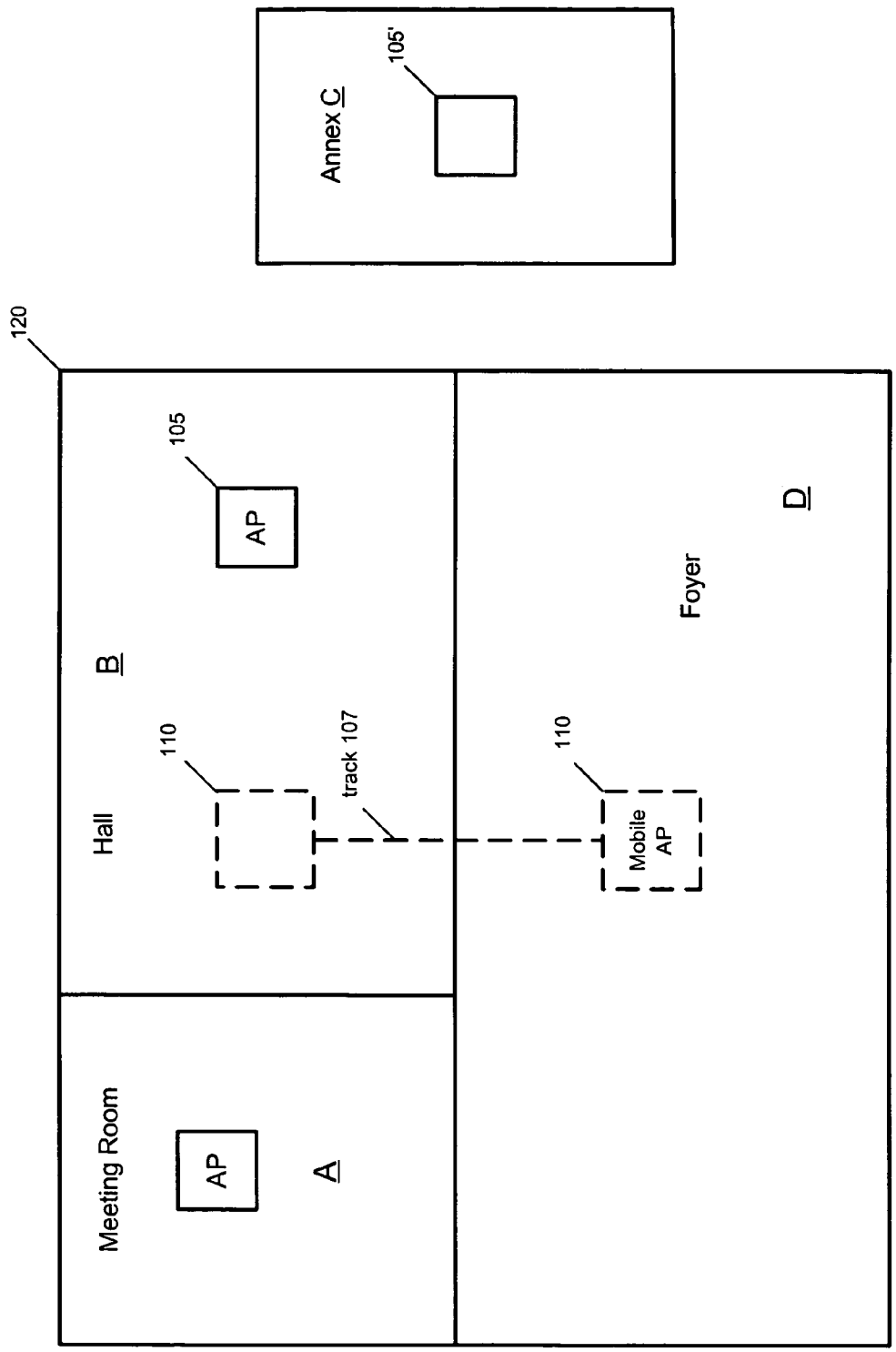
FIG. 2 is a schematic representation of the movement of the mobile access point of FIG. 1 between two different positions to provide bandwidth coverage in different zones at different times, in accordance with the principles of the present invention.

The principles and the advantages of the invention may be understood with reference to FIGS. 1 and 2. FIG. 1 schematically shows an exemplary deployment of mobile access point 110 to supplement an existing conventional wireless network 100. Wireless network 100 may be installed in a building, for example, a convention center 120, to provide wireless connectivity to wireless device users in rooms or meeting halls of the convention center. Wireless network 100 may include conventional components of a wired network. For example, the rooms and meeting hall in convention center 120 may be hard wired with Ethernet cables 102 to provide Internet access to patrons. FIG. 1 schematically shows, for example, Ethernet cable 102 leading to Internet server 104 from convention center 120. A patron, for example, at desktop computer 103, may access the Internet by connecting desktop computer 103 to Ethernet outlet 102A.

Wireless network 100 also includes a configuration of fixed or stationary access points 105 that are connected wirelessly or by wire lines to Ethernet cable 102. Stationary access points 105 may be access points that include any suitable transceiver circuits designed to operate in a multi-point mode, bridging multiple Wi-Fi devices to Ethernet cable 102. A stationary access point 105 may have a design range R over which it can be effective in communicating with Wi-Fi devices. Further, stationary access point 105 may have a design capacity or limit N on the number of Wi-FI devices that can be associated with access point 105 in multi-point mode operation. Stationary access points 105 may be access points of the type, which additionally or alternatively include transceiver circuits that can communicate with other access points 105 via radio frequency (e.g., repeater access point 106). Wireless network 100 may include such an access point 106 for wirelessly bridging a stationary access point 105' to Ethernet cable 102. It will be understood that stationary access points 105, 105' and 106 may be any suitable units that are commercially available (e.g., model Spectrum24® Access Point units that are sold by assignee Symbol Technologies Inc. of Holtsville, N.Y.). The number and locations of stationary access points in wireless network 100 may have been selected to provide a designed level of wireless bandwidth coverage in specific meeting rooms and halls of convention center 120. FIG. 2 shows, for example, stationary access points 105 and 105' positioned to provide a certain level of wireless bandwidth coverage for a certain number of users in room areas A, B and C. Wireless network 100 may not have stationary access points that are particularly positioned or designated to provide wireless coverage in areas outside room areas A, B and C (e.g., in foyer area D) where demand for wireless bandwidth may have been minimal. However with the increasing public use of wireless means for communication (e.g., for mobile computing, or Voice Over Internet Protocol (VoIP) telephony), the demand levels and patterns for wireless connectivity in convention center 120 may have changed. For example, more patrons in meeting rooms A, B and C may now use wireless laptops for mobile computing. Similarly, an increasing number of patrons may use now use foyer area D for mobile computing or for VoIP telephony, for example, during breaks or intermissions in the meetings held in areas A, B or C.

In accordance with the present invention, wireless network 100 may be supplemented with mobile access point 110 in a flexible geometrical configuration to respond to changing patterns of demand for wireless connectivity in convention center 120. Mobile access point 110 may, for example, be positioned at position X to provide additional bandwidth coverage in meeting room B or at position Y to provide bandwidth coverage in foyer area D.

Suitable conventional electrical and/or mechanical motive and control arrangements may be implemented to move mobile access from point X to point Y. In an exemplary arrangement, access point 110 may be motorized and configured to move along an overhead track 107, which may be installed in a ceiling plenum extending across areas B and D. The movement of access point 110 along track 107 may be supervised by a programmable microprocessor 150.

In convenient applications, microprocessor 150 may be programmed to move mobile access point 110 along track 107 to redistribute the bandwidth coverage provided by wireless network 100 over different areas in convention center 120 according to scheduled usage of these areas. For example, the positions of mobile access point 110 may be synchronized with the schedule of a meeting in area B. Mobile access point 110 may be positioned at point X to provide bandwidth coverage in area B during the time periods in which the meeting is progress and patrons are likely be present in area B. Similarly, mobile access point 110 may be positioned at point Y to provide bandwidth coverage in foyer area D during meeting break times in which the patrons may be expected to be present in foyer area D (attending, for example, to phone calls using VOIP). Thus, a single mobile access point 110 can be efficiently utilized provide coverage in a manner which addresses shifting patterns of bandwidth demand in convention center 120. The shifting patterns of bandwidth demand may be anticipated using any suitable methods. The suitable methods may, for example, involve monitoring the concentration of signal strength of a large number of devices in a certain area, or monitoring the number of RFID tag equipped devices passing through an RFID equipped portal such as a doorway, stairway or elevator entrance.

For convenience in the description herein, the use of only one exemplary mobile access point 110 for redistributing bandwidth coverage in a portion of convention center 120, has been shown and described with reference to FIGS. 1 and 2. It will, however, be readily understood that any suitable number of additional mobile access points may be used in network 100 as desired, for example, to redistribute bandwidth coverage in other portions of convention center 120.

Figure 3A:
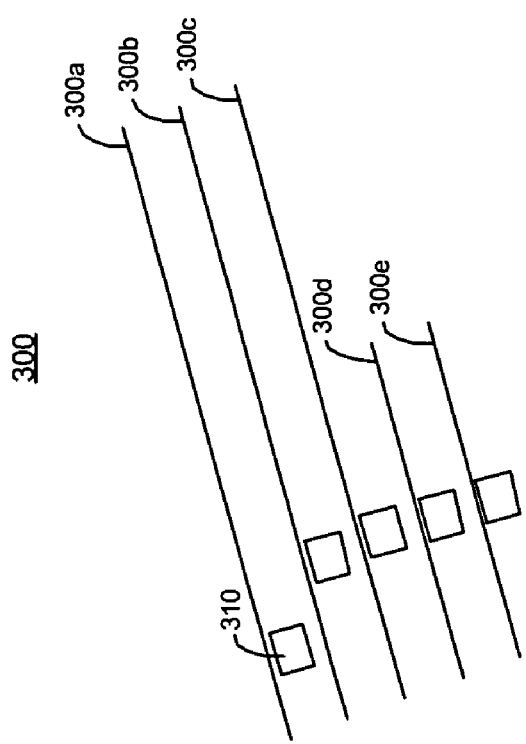
FIG. 3a is a schematic illustration of a configuration of access points including mobile access points that can travel on overhead rails, in accordance with the principles of present invention.
Figure 3B:
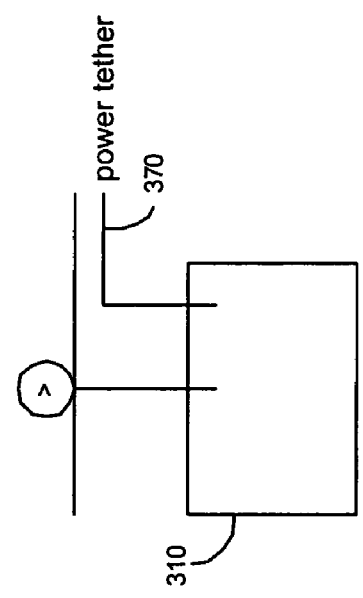
FIG. 3b is schematic representation of a power supply arrangement for the mobile access points utilized in the configuration of FIG. 3a, in accordance with the principles of present invention.

FIG. 3a shows, for example, a more extensive configuration (300) of mobile access points 310 that may be used to provide wireless coverage in a flexible manner in a large building. Configuration 300 also may include the conventional stationary access points (not shown). The large building may, for example, be convention center 120, or any other structure or area, for example, an airport terminal, warehouse, department store, shopping mall, transportation yard or manufacturing plant. Mobile access points 310 may be suitably configured to travel along a system of overhead guides or rails. For example, overhead rails 300a-e may be installed on the ceiling or along the walls of convention center 120. As mobile access points 310 travel along overhead rails 300a-e, they may be supplied with power via extensible power tethers (e.g., FIG. 3b power tether 370). Some versions of the system of overhead rails may include low voltage electrified rails to supply power to moving access points 310. Alternatively or additionally, mobile access points 310 may operate on rechargeable batteries. Suitable docking stations may be disposed at the ends or along tracks 300a-330e for recharging the batteries at convenient times. A network controller (e.g., controller 150) may be deployed to supervise the movement of mobile access points along rails 300a-e to provide different levels of wireless coverage in different geographic portions or zones of convention center 120 at different time as desired.

The network controller may be programmed to concentrate mobile access points 310 on particular zones at the times when there is a higher demand for wireless bandwidth in those particular zones. At other times the network controller may reconcentrate the mobile access points 310 to provide bandwidth in other zones, which then have a higher demand for wireless bandwidth, or may redistribute the mobile access points 310 uniformly to provide even levels of bandwidth coverage through out convention center 120. The network controller may be programmed to move the access points according to planned schedules, for example, in the manner previously described with reference FIGS. 1 and 2.

In a specific wireless network (which, for example, is capable of locating Wi-Fi devices by analyzing the signal strengths or can otherwise monitor access point usage), the network controller may be programmed to respond to real time usage or loading of particular access points. For applications with real time bandwidth requirements for quality of service (e.g., VoIP telephony), real time reconfiguration of access points 310 may be advantageously utilized to provide sufficient bandwidth coverage in a zone to ensure the quality of service.

In other types of wireless networks, (which, for example, locate wireless devices using triangulation algorithms) the network controller may be programmed to move access points 310 to positions that are optimal for determining the location of wireless devices by triangulation. Similarly, for security applications where it may be useful to pinpoint the location of the source of an intruding signal, the network controller may be programmed to move access points 310 to suitable positions for pinpointing the location of the source of an intruding signal.

The hardware and/or software functions of the network controller may reside in discrete microprocessors (e.g., microprocessor 150 as shown in FIG. 1) or may be distributed over components of the wireless network. For example, suitable controller software installed in the diverse access points may allow the access points to communicate with each other in real time to determine optimal locations for the access points.

Figure 4:
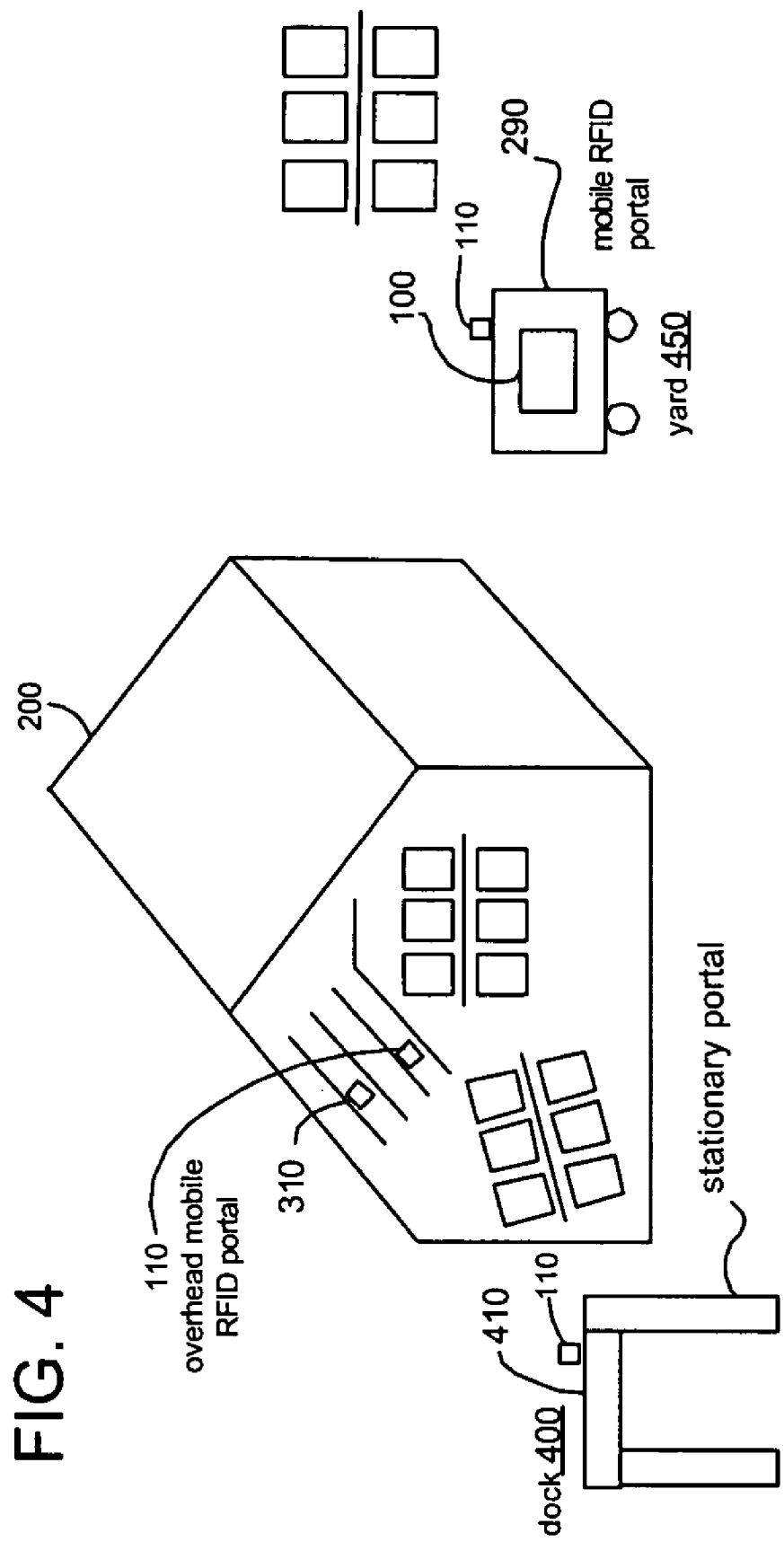
FIG. 4 is a schematic representation of a configuration of access points, which includes both stationary and mobile types of access points. The mobile access points include those that can travel on overhead rails and those that can travel on the floor vehicles, in accordance with the principles of the present invention.

It will be understood that the foregoing is only illustrative of the principles of the invention, and that various modifications can be made by those skilled in the art without departing from the scope and spirit of the invention. For example, the use of mobile access points may be integrated with radio frequency identification (RFID) portal systems that can be used for asset location services. An exemplary mobile RFID portal system is described, in co-pending and co-assigned provisional patent application Ser. No. 10/837,438, "Mobile Portal For Radio Frequency Identification Of Objects," filed Apr. 30, 2004, which is hereby incorporated by reference in its entirety herein. FIG. 4 shows mobile floor and overhead RFID portal vehicles in the system described in the referenced patent application, which have been further modified to include access points 110 which can be utilized for data communications with RFID tag readers disposed in the mobile RFID portal vehicles.

The invention claimed is:

1. A wireless network for providing a geographically-flexible bandwidth coverage area in a structure, comprising:
    at least one mobile access point; and
    a network controller in communication with the at least one mobile access point, wherein the network controller is configured to:
        receive an indication of relative demand for access to the wireless network by users at a plurality of geographic locations within the structure,
        evaluate the indication of relative demand for access to the wireless network, and
        control the movement of the at least one mobile access point between the plurality of geographic locations based at least in part on the evaluation of the indication of relative demand for access to the wireless network.

2. The wireless network of claim 1 wherein the network controller is further configured to control the movement of the at least one mobile access point between the plurality of geographic locations according to a schedule.

3. The wireless network of claim 1 further comprising an arrangement for determining the location of a wireless user device coupled to the network controller, wherein the network controller is further configured to control the movement of the at least one mobile access point between the plurality of geographic locations to improve the determination of the location of the wireless user device.

4. The wireless network of claim 1 wherein the network controller is further configured to control the movement of the at least one mobile access point between the plurality of geographic locations in response to a real time quality of service requirement.

5. The wireless network of claim 1 further comprising an overhead rail coupled to the at least one mobile access point and to the building, wherein the at least one mobile access point is configured to move between the plurality of geographic locations via the overhead rail.

6. The wireless network of claim 1 further comprising a floor vehicle coupled to the mobile access point, wherein the at least one mobile access point is configured to move between the plurality of geographic locations via the floor vehicle.

7. The wireless network of claim 1 further comprising a user wireless device in communication with the at least one mobile access device, wherein the at least one mobile access point is configured to move between the plurality of geographic locations with the user wireless device.

8. The wireless network of claim 7 wherein the user wireless device is a mobile RFID portal.

9. A wireless network housed within a structure having a plurality of geographic locations, comprising:
    a grid of rails disposed in the plurality of geographic locations;
    at least one mobile access point configured to travel between the plurality of geographic locations on the grid of rails; and
    a network controller coupled to the at least one mobile access point, wherein the network controller configured to:
        receive an indication of relative demand for access to the wireless network by users at the plurality of geographic locations,
        evaluate the indication of relative demand for access to the wireless network, and
        selectively vary a position of the mobile access point among the plurality of geographic locations based at least in part on the evaluation of the indication of relative demand for access to the wireless network.

10. The wireless network of claim 9 wherein the grid of rails comprises an electrified rail for supplying power to the mobile access point.

11. The wireless network of claim 9 wherein the mobile access point is powered by rechargeable batteries, and the wireless network further comprises a docking station for recharging the rechargeable batteries.

12. The wireless network of claim 9, further comprising:
    a mobile RFID portal having an RFID reader, wherein the at least one mobile access point is disposed on the mobile RFID portal by which the RFID reader communicates data over the wireless network.

13. A method of providing wireless communication network services to wireless device users in a structure, comprising:
    receiving, via a network controller, an indication of relative demand for access to the wireless network by users at a plurality of geographic locations within the structure;
    evaluating, via the network controller, the indication of relative demand for access to the wireless network; and
    automatically moving, via the network controller, a mobile access point between the plurality of geographic locations to provide additional bandwidth for wireless devices that are within a range R of each respective geographic location based at least in part on the evaluation of the indication of relative demand for access to the wireless network.

14. The method of claim 13 wherein automatically moving comprises automatically moving the mobile access point from a first geographic location to a second geographic location according to a schedule.

15. The method of claim 13 wherein automatically moving comprises automatically moving the mobile access point from a first geographic location to a second geographic location to meet a quality of service requirement for wireless device users in the proximity of the second geographic location.

16. The method of claim 13 further comprising locating a wireless device within the communication network, and wherein automatically moving further comprises automatically moving the mobile access point from a first geographic location to a second geographic location to locate the wireless device.

17. The method of claim 13 wherein the wireless device is an RFID portal and wherein automatically moving comprises co-disposing the RFID portal and the mobile access point on a common vehicle.

18. A method for dynamically changing a bandwidth of a plurality of geographic locations within a structure serviced by a wireless communication network, comprising the steps of:
  determining, via a network controller, a first increase in user demand to access the wireless communication network via a first access point disposed at a first geographic location; and
  automatically moving, via the network controller, a first mobile access point within a range R of the first geographic location in response to the first increase in user demand.

19. The method of claim 18, further comprising the steps of:
  determining, via the network controller, a second increase in user demand to access the wireless communication network via a second access point disposed at a second geographic location; and
  automatically moving, via the network controller, a second mobile access point within a range R of the second geographic location in response to the second increase in user demand.

20. The method of claim 18, further comprising the steps of:
  determining, via the network controller, a second increase in user demand to access the wireless communication network via a second access point disposed at a second geographic location; and
  automatically moving, via the network controller, the first mobile access point within a range R of the second geographic location in response to the second increase in user demand.

* * * * *

UNITED STATES PATENT AND TRADEMARK OFFICE
CERTIFICATE OF CORRECTION

| | | |
|---|---|---|
| PATENT NO. | : 7,496,070 B2 | Page 1 of 1 |
| APPLICATION NO. | : 10/881550 | |
| DATED | : February 24, 2009 | |
| INVENTOR(S) | : Vesuna | |

It is certified that error appears in the above-identified patent and that said Letters Patent is hereby corrected as shown below:

On the Title Page
1. Item (54), in Title, delete "RECONFIGUREABLE" and insert
-- RECONFIGURABLE --, therefor.

2. In Column 1, Line 1, delete "RECONFIGUREABLE" and insert -- RECONFIGURABLE --, therefor.

3. In Column 5, Line 66, delete "VOIP)." and insert -- VoIP). --, therefor.

IN THE CLAIMS

4. In Column 8, Line 10, in Claim 7, delete "device," and insert -- point, --, therefor.

Signed and Sealed this

Thirty-first Day of August, 2010

David J. Kappos
*Director of the United States Patent and Trademark Office*